United States Patent
Caretti et al.

(10) Patent No.: US 10,772,114 B2
(45) Date of Patent: Sep. 8, 2020

(54) SCHEDULING METHOD AND SYSTEM (71) Applicant: Telecom Italia S.p.A., Milan (IT)

(72) Inventors: Marco Caretti, Turin (IT); Gian Michele Dell'aera, Turin (IT); Francesco Mauro, Turin (IT)

(73) Assignee: Telecom Italia S.p.A., Milan (IT)

( * ) Notice: Subject to any disclaimer, the term of this patent is extended or adjusted under 35 U.S.C. 154(b) by 135 days.

(21) Appl. No.: 15/769,522

(22) PCT Filed: Oct. 20, 2015

(86) PCT No.: PCT/EP2015/074223
§ 371 (c)(1),
(2) Date: Apr. 19, 2018

(87) PCT Pub. No.: WO2017/067576
PCT Pub. Date: Apr. 27, 2017

(65) Prior Publication Data
US 2018/0317249 A1 Nov. 1, 2018

(51) Int. Cl.
*H04W 72/12* (2009.01)
*H04W 72/04* (2009.01)
*H04W 84/04* (2009.01)

(52) U.S. Cl.
CPC ... *H04W 72/1247* (2013.01); *H04W 72/0446* (2013.01); *H04W 84/042* (2013.01)

(58) Field of Classification Search
None
See application file for complete search history.

(56) References Cited

U.S. PATENT DOCUMENTS 6,438,375 B1 * 8/2002 Muller ............. H04W 52/0216
455/435.3
7,219,347 B1 * 5/2007 Waddington .......... G06F 9/4881
718/102

(Continued)

FOREIGN PATENT DOCUMENTS

EP 1841276 A2 10/2007
EP 2676514 A1 12/2013

(Continued)

OTHER PUBLICATIONS

Jun 9, 2016—(WO) ISR and Written Opinion—App PCT/EP2015/074223.

(Continued)

*Primary Examiner* — Gregory B Sefcheck
(74) *Attorney, Agent, or Firm* — Banner & Witcoff, Ltd.

(57) ABSTRACT

A method for allocating resource blocks on a cellular network including transceiver stations to provide cell coverage for allowing user equipment within the cell to exchange data via uplink or downlink. The method includes, at a cell, reiterating operations at each or a group of transmission time intervals. The operations include listing user equipment requiring resource blocks in a priority list; b) for the user equipment listed in the priority list, executing operations b1) and b2) or b1) and b3): b1) selecting a set of resource blocks including at least one resource block; b2) if the selected set of resource blocks has not been assigned to other user equipment, assigning to the user equipment the selected set of resource blocks; b3) if the selected set of resource blocks has been assigned to other user equipment, replacing the user equipment from the priority list with user equipment in a collision list.

15 Claims, 3 Drawing Sheets

(56) References Cited

U.S. PATENT DOCUMENTS

| | | | | |
|---|---|---|---|---|
| 8,537,765 | B2* | 9/2013 | Manbo | H04W 72/048 370/329 |
| 8,989,667 | B2* | 3/2015 | Mukherjee | G06F 9/5027 455/41.2 |
| 8,995,388 | B2* | 3/2015 | Chao | H04L 47/00 370/330 |
| 9,042,385 | B2* | 5/2015 | Stamoulis | H04W 72/1247 370/395.42 |
| 9,363,822 | B1* | 6/2016 | Oroskar | H04L 1/1854 |
| 9,591,641 | B2* | 3/2017 | Zhao | H04W 72/1221 |
| 9,642,155 | B2* | 5/2017 | Wijetunge | H04W 72/1226 |
| 9,674,837 | B1* | 6/2017 | Sevindik | H04L 5/0035 |
| 9,780,822 | B2* | 10/2017 | Krishnannoorthi | H04W 72/042 |
| 9,910,706 | B2* | 3/2018 | Cropper | G06F 9/5077 |
| 10,027,359 | B2* | 7/2018 | Krishnannoorthi | H04W 72/1247 |
| 10,039,070 | B2* | 7/2018 | Lee | H04W 76/14 |
| 10,231,259 | B2* | 3/2019 | Lin | H04W 72/1273 |
| 10,271,342 | B2* | 4/2019 | Ren | H04L 1/1854 |
| 10,412,754 | B2* | 9/2019 | Khoryaev | H04W 72/1242 |
| 10,440,730 | B2* | 10/2019 | Jung | H04W 92/18 |
| 2012/0026986 | A1 | 2/2012 | Dass | |
| 2012/0163208 | A1 | 6/2012 | Kamble et al. | |
| 2013/0163540 | A1* | 6/2013 | Roh | H04W 72/085 370/329 |
| 2016/0029403 | A1* | 1/2016 | Roy | H04W 72/0406 370/336 |

FOREIGN PATENT DOCUMENTS

| | | |
|---|---|---|
| WO | 20120110650 A1 | 8/2012 |
| WO | 2013127665 A1 | 9/2013 |
| WO | 2015/019277 A1 | 2/2015 |

OTHER PUBLICATIONS

A. Pokhariyal, et al., "HARQ Aware Frequency Domain Packet Scheduler with Different Degrees of Fairness for the UTRAN Long Term Evolution", Vehicular Technology Conference, 2007. VTC2007-Spring. IEEE 65th, Apr. 22-25, 2007, pp. 2761-2765.

P. Okvist, et al., "LTE Frequency Selective Scheduling Performance and Improvements Assessed by Measurements", Personal Indoor and Mobile Radio Communications (PIMRC), 2011 IEEE 22nd International Symposium on, Sep. 11-14, 2011, pp. 1919-1923.

* cited by examiner

SCHEDULING METHOD AND SYSTEM

BACKGROUND OF THE INVENTION

Field of the Invention

The present invention generally relates to wireless communication networks, such as radio mobile or cellular networks—e.g., 2G, 3G, 4G or LTE/LTE-Advanced, and, in view of new forthcoming technologies, 5G (and beyond) cellular networks. More particularly, the present invention relates to heterogeneous cellular networks, and to a method for efficiently managing allocation of radio resources blocks in such cellular networks.

Overview of the Related Art

Cellular networks (e.g., 2G, 3G, LTE/LTE-Advanced and the forthcoming 5G cellular networks) allow data traffic (also referred to as traffic load) to be high-speed conveyed between a fixed-location transceiver base station (or node) radiating radio waves over a respective land area (cell) and user equipment (e.g., user terminals, such as cellular phones) within the cell.

In order to optimize performances while maintaining a certain degree of fairness, cellular networks are provided with a network scheduler (hereinafter simply "scheduler") adapted to allocate resources to different user equipment in a same cell, according to policies that can take into account the user's quality requirements and their propagation and interference conditions.

Starting from the LTE cellular networks, with the introduction of the OFDM (Orthogonal Frequency-Division Multiplexing) access technique, it is possible to exploit channel selectivity with the introduction of scheduling algorithms that are able to allocate resources to user equipment both in the time and frequency domains.

Aim of frequency-selective schedulers is to improve the cell spectral efficiency serving user equipment only in the portion of the bandwidth with the best channel quality. A portion of the bandwidth which can be allocated as a resource to a user is usually referred to as sub-band. A sub-band is a collection of n adjacent Physical Resource Blocks (PRBs) where the value of n depends on the channel bandwidth and the Channel Quality Indicator (CQI) feedback mode.

Most of the known frequency-selective schedulers are based on the allocation of radio resources only based on functions that determine the priority of user equipment compared to one another. These techniques are limited to serve user equipment starting with the one with higher priority and continuing with the one with lower priority, thus not considering that in this way, user equipment with higher priority are always served with their best resources, while user equipment with lower priorities are forced to be served with the remaining (not best) resources. From cell spectral efficiency point of view the gain obtained by the user equipment served with the best resources are compensated by the losses due to the user equipment served with the remaining resources.

There are also some known scheduling techniques that use a metric as "proportional fair" for the classification of the users. These techniques allow all the user equipment with a certain "fairness" to be served, but do not allow all the user equipment to fully take advantage of the channel frequency selectivity; therefore the overall cell capacity is not fully exploited.

The simultaneous allocation of resources to user equipment in different portions of the bandwidth is possible only when the users are configured with selective reporting of the channel quality. This need has been started with the beginning of the introduction of networks using OFDMA multiple access, such as the WiMax. However, the implementation of an optimal frequency selective scheduling algorithm is computationally prohibitive because it is based on the attempt to allocate resources to each user equipment on portions of the bandwidth where the best channel quality can be experimented. Moreover, when more than one user equipment report a good channel quality over the same resources, the scheduler has to face colliding requests of resource allocation.

Over the years, several suboptimal solutions have been proposed to reduce the computational complexity of frequency selective scheduling algorithms, allowing the allocation of resources to a subset of user equipment in such a way that each user equipment of the subset is served with the resources corresponding to the better channel quality reported by the user equipment itself.

Document *HARQ Aware Frequency Domain Packet Scheduler with Different Degrees of Fairness for the UTRAN Long Term Evolution* by A. Pokhariyal, et al., Vehicular Technology Conference, 2007. VTC2007-Spring. IEEE 65$^{th}$, 22-25 Apr. 2007, Pages 2761-2765, proposes a scheduler whose operation is divided in two steps: a time domain step, for the selection of N users based on a time based metric, and a frequency domain step, for the allocation of the N users on their best available sub-bands. The total number of available sub-bands should be calculated before, since a certain number of resources have to be allocated for the retransmissions. The retransmissions will be considered after the allocation of the first transmissions, which have the best sub-bands reserved for them. Applicant remarks that this scheduler has been developed only for the downlink and does not optimize the cell throughput, since the number of users that has to be served is already decided; therefore some users can be scheduled on resources that are not optimal for them.

Patent application US 20120026986 discloses a method for downlink frequency selective scheduling in LTE MAC based on channel quality feedback. The method employs Channel Quality Indicator (CQI) based feedback from the user equipment for allocation of the downlink bandwidth. The method defines a threshold value for the CQI and user equipment that have sub-bands with CQI lesser than the defined threshold value will not be allocated resources in the corresponding sub-band. Applicant remarks that this algorithm is defined only for the downlink, and it is not capable of optimizing the cell throughput since the resources are not optimally allocated.

Document *LTE Frequency Selective Scheduling Performance and Improvements Assessed by Measurements* by Okvist, P., et al., Personal Indoor and Mobile Radio Communications (PIMRC), 2011 IEEE 22nd International Symposium on, 11-14 Sep. 2011, Pages 1919-1923 discloses a way to optimize the CQI value using a prediction technique, since the scheduler uses the reported CQI some transmission time Intervals (TTIs) after its calculation by the user equipment.

Patent application US 20120163208 discloses a method, system, and base station for providing subband Signal to Noise Ratio (SNR) correction in the scheduling of communication resources. A Scheduling Correction (SC) utility receives periodic subband and wideband CQI reports from one or more wireless devices. The SC utility records a subframe report period for a respective subband CQI report. The SC utility calculates the age of the subband report to determine whether the subband CQI report remains valid. If the subband report is invalid, the SC utility utilizes the wideband CQI report for (current) transmission scheduling. However, if the subband report is valid, the SC utility utilizes: (a) the subband CQI report for transmission scheduling from the most current reporting subframe; or (b) a modified subband CQI value with a correction that utilizes the wideband CQI report, if the subband CQI report was not received at the most current reporting subframe.

Patent application EP 2676514 discloses a method and radio network entity for scheduling resources comprising: selecting the user for which the scheduling metric calculated based on CQI reports is a main maximum in a certain frequency subband and checking whether there is another subband in which the selected user has a calculated scheduling metric value higher than the main maximum. If so, secondary maxima of scheduling metrics for the user and others in another different subband are searched and compared with the previous calculated maximum. According to the result of this comparison, each user is assigned to at least one frequency subband, up to K subbands which can be adjacent or not depending upon the configuration of the network entity in uplink and downlink (e.g., supporting LTE). Scheduling of both time and frequency resources is optimized and simultaneously the throughput of users in a cell is maximized.

Patent application WO 2013127665 discloses a method and a system for scheduling the downlink in LTE networks based on QoS. The method comprises: performing a packet scheduling for a plurality of user terminals based on information regarding QoS classes, the information regarding QoS classes is included in QoS class identifiers received from an Evolved Packet Core providing communication services to the user terminals, the method further comprising receiving channel quality indicators from the plurality of user terminals and performing the scheduling also on the basis of the received channel quality indicators. The system of the invention is arranged to implement the method of the invention.

SUMMARY OF INVENTION

The Applicant has recognized that none of the cited prior art solutions is completely satisfactory, to operate only for the downlink and to optimize the cell throughput. Indeed, while some prior art solutions provide a certain degree of fairness among the user equipment located in the cell, this fairness is obtained at the expense of a sub-optimal resource allocation (i.e., the user equipment is not served with their best radio resources).

In view of the above, the Applicant has tackled the problem of devising a simple and effective solution aimed at radio resources allocation in LTE networks that offers the possibility of serving user equipment with fairness, and at the same time allocating radio resources taking into considerations which radio resources are the best for each user equipment to be served.

The Applicant has found that an improved resource allocation may be obtained by combining the provision of a priority order for serving the user equipment with the possibility of making user equipment wait for a better radio resource if the requested one is not available at the request.

An aspect of the present invention provides for a method for allocating resource blocks on a cellular network. The cellular network comprises a plurality of transceiver stations each one configured to provide radio coverage over a corresponding cell for allowing user equipment within the cell to exchange data flows via the uplink or downlink. The method comprises, at a cell, reiterating the following sequence of operations at some or at each transmission time interval or group of transmission time intervals:

a) listing user equipment requiring resource blocks in a corresponding priority list according to a first ordered sequence, the first ordered sequence being based on a priority of the user equipment being served;

b) following the first ordered sequence, for the user equipment listed in the priority list, carrying out the following operations b1) and b2) or b1) and b3):

b1) selecting a corresponding first set of resource blocks comprising at least one resource block;

b2) if the selected first set of resource blocks has not been already assigned to other user equipment, assigning to the user equipment the selected first set of resource blocks for serving the user equipment;

b3) if the selected first set of resource blocks has been already assigned to other user equipment, removing the user equipment from the priority list and inserting the user equipment in a collision list.

The sequence of operations further comprises, if the collision list is not empty, before carrying out operation b), assigning second sets of resource blocks to user equipment listed in the collision list, for serving the user equipment listed in the collision list.

According to an embodiment of the present invention, removing the user equipment from the priority list and inserting the user equipment in a collision list further comprises inserting the user equipment at the bottom of the collision list.

According to an embodiment of the present invention, assigning second sets of resource blocks to the user equipment listed in the collision list comprises selecting the first user equipment of the collision list, removing the user equipment from the collision list and selecting a corresponding second set of resource blocks comprising at least one resource block. Assigning second sets of resource blocks to the user equipment listed in the collision list further comprises:

if the selected second set of resource blocks has not been already assigned to other user equipment, assigning to the user equipment the selected second set of resource block for serving the user equipment;

if the selected second set of resource blocks has been already assigned to other user equipment, inserting the user equipment at the bottom of the collision list.

According to an embodiment of the present invention, selecting a corresponding first set of resource blocks comprising at least one resource block for a user equipment comprises selecting the best first set of resource blocks for serving the user equipment.

According to an embodiment of the present invention, selecting a corresponding second set of resource blocks comprising at least one resource block for a user equipment comprises selecting the best second set of resource blocks for serving the user equipment.

According to an embodiment of the present invention, the method further comprises, before carrying out operation a), assigning sets of resource blocks to user equipment which require to retransmit packets of data that in a previous transmission time interval or in a previous group of transmission time intervals have not been correctly received.

According to an embodiment of the present invention, listing user equipment requiring resource blocks in a corresponding priority list according to a first ordered sequence based on a priority of each user equipment in being served comprises, for each user equipment requiring resource blocks, calculating a corresponding priority value through a priority function based on at least one among channel quality indicator, block error rate, ACK number, and throughput. Listing user equipment requiring resource blocks in a corresponding priority list according to a first ordered sequence based on a priority of each user equipment in being served further comprises ordering the user equipment in the priority list based on the priority values calculated for the user equipment.

According to an embodiment of the present invention, each user equipment having a set of resource blocks assigned thereto is inserted in a served list. The user equipment are listed in the served list according to a second ordered sequence based on the priority values calculated for the user equipment.

According to an embodiment of the present invention, the method further comprises, after having carried out operation b), checking whether there are still available resource blocks to be assigned, and, if there are still available resource blocks, assigning the still available resource blocks to the user equipment listed in the served list following the second ordered sequence.

According to an embodiment of the present invention, each set of resource blocks comprises a single resource block or a group of adjacent resource blocks.

Another aspect of the present invention relates to a transceiver station of a cellular network configured to provide radio coverage over a corresponding cell for allowing user equipment within the cell to exchange data flows in an uplink or downlink. The transceiver station comprises a scheduler for allocating resource blocks to the user equipment. The scheduler comprises a priority calculator configured to list user equipment requiring resource blocks in a corresponding priority list according to a first ordered sequence. The first ordered sequence is based on a priority of each user equipment being served. The scheduler further comprises a collision handler configured to carry out the following operations:
 a) following the first ordered sequence, for the user equipment listed in the priority list, carrying out the following operations a1) and a2) or a1) and a3):
 a1) selecting a corresponding first set of resource blocks comprising at least one resource block;
 a2) if the selected first set of resource blocks has not been already assigned to other user equipment, assigning to the user equipment the selected first set of resource blocks for serving the user equipment;
 b3) if the selected first set of resource blocks has been already assigned to other user equipment, removing the user equipment from the priority list and inserting the user equipment in a collision list.

If the collision list is not empty, before carrying out operation a), the collision handler is further configured to assign second sets of resource blocks to user equipment listed in the collision list, for serving the user equipment listed in the collision list.

According to an embodiment of the present invention, the collision handler is further configured to remove the user equipment from the priority list and insert the user equipment in a collision list by inserting the user equipment at the bottom of the collision list.

According to an embodiment of the present invention, the collision handler is further configured to assign second sets of resource blocks to the user equipment listed in the collision list by carrying out the following operations:
 selecting first user equipment of the collision list;
 removing the user equipment from the collision list;
 selecting a corresponding second set of resource blocks comprising at least one resource block;
 if the selected second set of resource blocks has not been already assigned to other user equipment, assigning to the user equipment the selected second set of resource block for serving the user equipment;
 if the selected second set of resource blocks has been already assigned to other user equipment, inserting the user equipment at the bottom of the collision list.

According to an embodiment of the present invention, the collision handler is configured to select a corresponding first set of resource blocks comprising at least one resource block for a user equipment by selecting the best first set of resource blocks for serving the user equipment.

According to an embodiment of the present invention, the collision handler is configured to select a corresponding second set of resource blocks comprising at least one resource block for user equipment by selecting the best second set of resource blocks for serving the user equipment.

BRIEF DESCRIPTION OF DRAWINGS

These and other features and advantages of the proposed solution will be made apparent by the following description of some exemplary and non limitative embodiments thereof; for its better intelligibility, the following description should be read making reference to the attached drawings, wherein.

DETAILED DESCRIPTION

Figure 1:
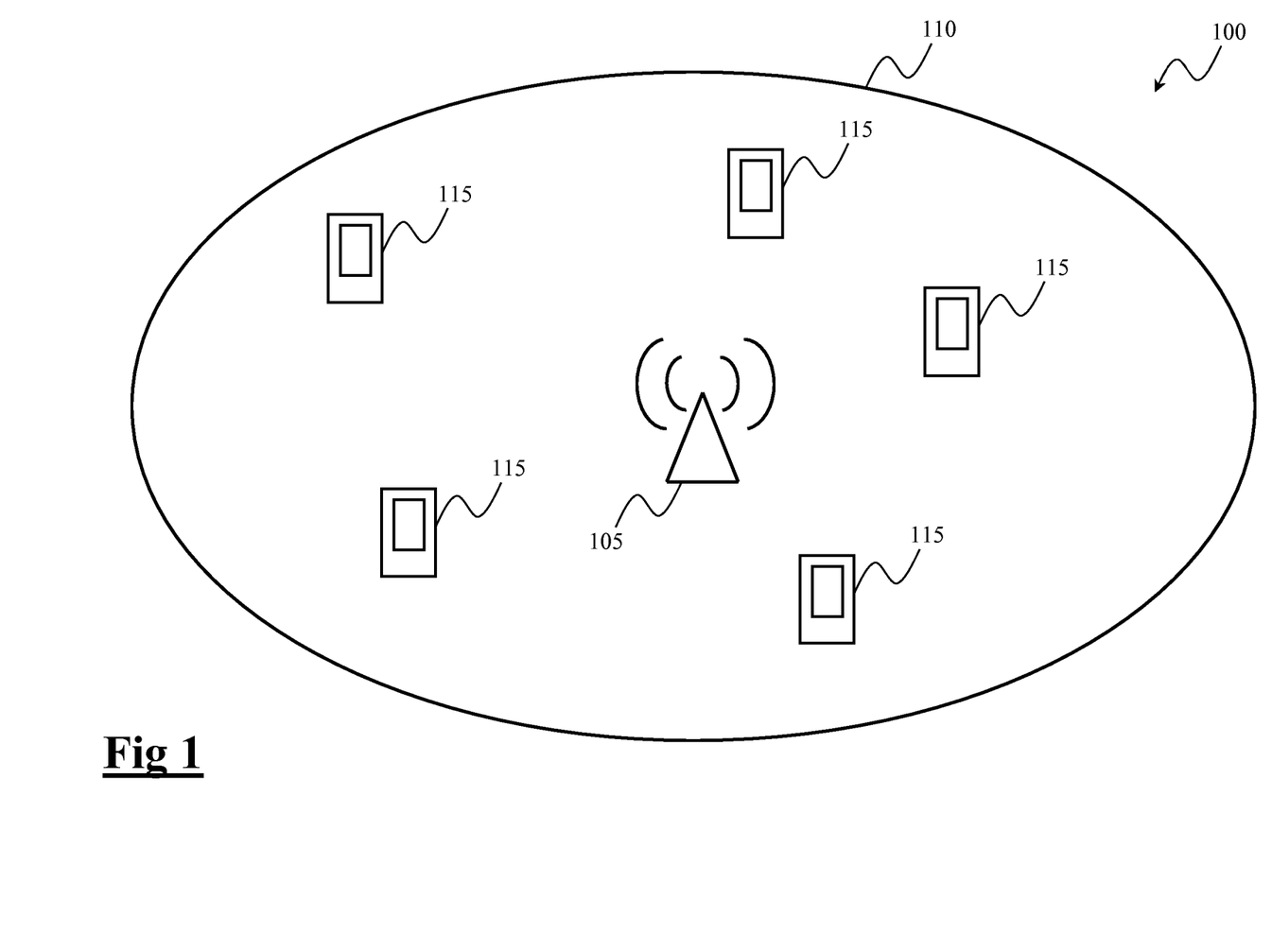
FIG. 1 schematically shows a portion of a cellular network wherein the present invention may be applied.

With reference to the drawings, a portion of a cellular network 100 in which a scheduling algorithm according to embodiments of the present invention may be applied is schematically shown in FIG. 1.

The cellular network 100 (e.g., compliant with the 3GPP LTE/LTE-Advanced standard) comprises a plurality (only one depicted in the figure) of transceiver stations (or network nodes, e.g. Evolved Node B (eNodeB)) 105. Each network node 105 is configured to provide radio coverage over a corresponding geographic area, referred to as a cell 110, for allowing user equipment 115 (e.g., mobile phones) within the cell 110 to exchange, in uplink and downlink, data flows (e.g., web browsing, e-mailing, voice, or multimedia data flows). For this purpose, the generic network node 105 is equipped with an antenna system coupled with a radio transceiver circuit as well as hardware provided with processing capabilities, such as processing circuits and memory circuits.

The cellular network 100 exploits an OFDM modulation scheme, in which the radio resources are allocated in a time-frequency domain. The time domain is subdivided in radio frames each having a time duration of 10 ms. Each radio frame is formed by 10 subframes having a time duration of 1 ms, referred to as Transmission Time Intervals (TTI). Each TTI is in turn formed by two temporal slots each having a time duration of 0.5 ms and corresponding to 7 OFDM symbols. In the frequency domain, the bandwidth is subdivided into 180 kHz sub-channels, each one formed by 12 consecutive and equi-spaced OFDM sub-carriers.

According to such an OFDM modulation scheme, the smallest radio resource unit which can be allocated to user equipment 115 is the so called Resource block (RB). An RB has the duration of a temporal slot (0.5 ms) and is formed by the 12 sub-carriers of a sub-channel.

According to an embodiment of the present invention, the network node 105 is configured to implement scheduling by carrying out a resource allocation algorithm through which such network node 105 decides how to allocate RBs to user equipment 115 within the corresponding cell 110 to send or receive data flows. Scheduling is done per sub-frame level (i.e., each 1 ms TTI). According to an embodiment of the present invention, each single allocation of RBs to user equipment 115 involves the allocation of one or more adjacent RBs, hereinafter referred to as "sub-band" as a whole.

Thanks to the use of an OFDM modulation scheme, a network node 105 is capable of scheduling resources based on the channel conditions (both in time and in frequency) to exploit or to avoid fast variations in the channel quality, increasing thus the transmission and reception efficiency. In order to properly work, the scheduling has to be aware of the channel conditions, which can be obtained through proper quality indicators such as for example the Channel Quality Indicator (CQI), the Sounding Reference Signal (SRS) and the Demodulation Reference Signal (DMRS).

A scheduling resource algorithm according to embodiments of the present invention will be now described in the following description.

The scheduling resource algorithm according to embodiments of the present invention can be applied both in downlink and uplink. In the downlink case, the scheduling resource algorithm may exploit CQI as quality indicator, while in the uplink case it may exploit SRS and DMRS.

For the resource allocation in downlink, the scheduling resource algorithm according to embodiments of the present invention may be repeated at each TTI, while for the resource allocation in uplink, it may be repeated at each TTI or less frequently, for example every a plurality of TTIs.

The phases of the scheduling resource algorithm according to embodiments of the present invention are the same both for the downlink and the uplink. However, the downlink scheduler resource algorithm and the uplink scheduler resource algorithm may operate in parallel, one independently from the other. For the sake of conciseness, the following will make reference only to the downlink case. However similar considerations apply to the uplink case.

Figure 2:
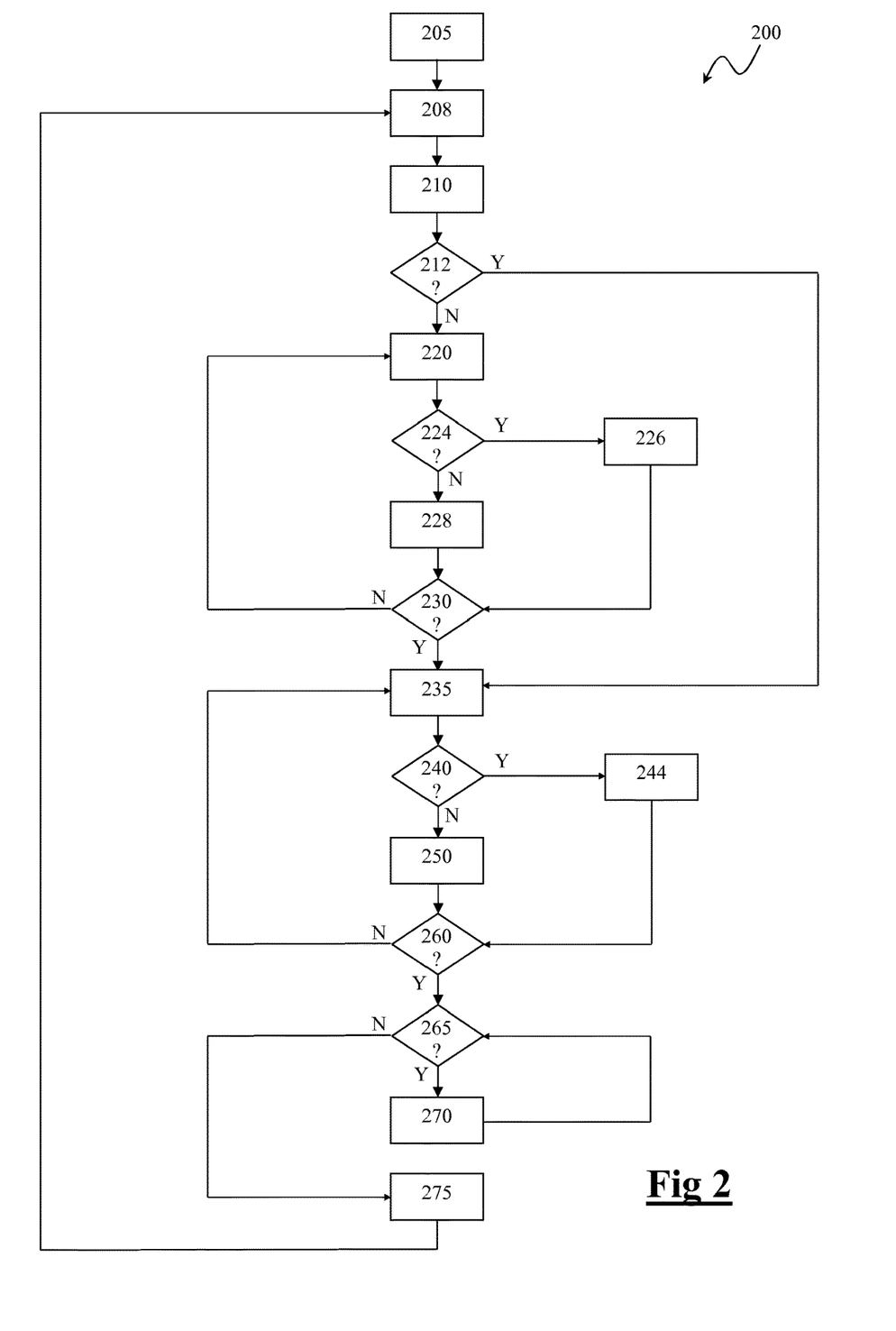
FIG. 2 schematically shows an activity flow of an allocation algorithm adapted to be used in the cellular network of FIG. 1, according to an embodiment of the present invention.

FIG. 2 is a flow chart illustrating the main phases 205-275 of a scheduling resource algorithm 200 according to an embodiment of the present invention, adapted to be carried out by a network node 105 for optimally allocating resources to user equipment 115 within the corresponding cell 110. Making reference to the downlink case, the procedure corresponding to the phases 208-275 of the scheduling algorithm 200 illustrated in FIG. 2 is repeated at each TTI.

As will be explained in greater detail in the following description, the scheduling resource algorithm 200 according to an embodiment of the present invention makes use of three different lists, referred to as Priority List, Collision List, and Served User List.

The Priority List lists all the user equipment 115 within the cell 110 that require resources (sub-bands each one comprising one or more adjacent RBs) in the considered TTI. Each user equipment 115 of the Priority List is associated with a corresponding priority value PV quantifying the priority of that user equipment 115 as being served with sub-band, i.e., quantifying the advantage obtained by prioritizing the allocation of sub-bands to the user equipment 115. The user equipment 115 of the Priority List is listed in an ordered sequence according to the corresponding priority values PV, so that user equipment 115 having higher priorities (e.g., having higher priority values PV) is listed before user equipment 115 having lower priorities (e.g., having lower priority values PV). According to an embodiment of the present invention, the priority values PV are calculated through a priority function based on sub-band CQI values received by each user equipment 115 within the cell 110 as well as on long term information related to the user equipment 115 (such as for example Block Error Rate (BLER), ACK number, and/or Throughput). For example, the priority values PV may be calculated by considering the users SINR (Signal to Interference plus Noise Ratio); in such a way the users are ordered within the Priority List starting from the user with the higher SINR to the ones with lower SINR.

According to an embodiment of the present invention, the higher the priority value PV of user equipment 115, the higher its priority.

The Collision List lists the user equipment 115 within the cell 110 that required resources (sub-band) in previous TTIs, but that are not still served because of collisions with other user equipment 115. A collision occurs when more user equipment 115 require a same sub-band (because the sub-band is considered the best one for all of the user equipment 115); in this case, only the user equipment 115 having the highest priority (i.e., the one having the highest priority value PV) may be served with the requested sub-band.

The Served User List is an ordered list of not colliding user equipment 115 (ordered according to the priority values PV) that have been served within the cell 110 with their best resources (sub-bands).

The first phase of the scheduling resource algorithm 200 according to an embodiment of the present invention (block 205) is an initialization phase which provides for setting the Priority List and the Collision List to respective empty lists.

The sequence corresponding to the next phases 208-275 of the scheduling resource algorithm 200 according to an embodiment of the present invention is repeated for each TTI.

Firstly, the scheduling resource algorithm 200 according to an embodiment of the present invention provides for allocating resources (sub-bands) to user equipment 115 that have to retransmit some packets of data that in the previous TTI have not been correctly received (block 208), due for example to a poor channel conditions, high interference on the used resource blocks or because the user is too far from the network node 105. The allocation of resources for the retransmission may be carried out in different ways.

According to an embodiment of the invention, phase 208 provides for selecting a different sub-band comprising a different number of RBs compared to the sub-band used in the previous TTI, taking into account the mutated channel conditions.

According to another embodiment of the present invention, phase 208 provides for allocating the same sub-bands allocated during the previous transmission.

According to a still another embodiment of the present invention, phase 208 provides for allocating a different sub-band compared to the transmission in the previous TTI—but using the same number of RBs—, exploiting the CQI reported by each user equipment 115. The resource allocation may be carried out without taking into account the collisions (i.e., based on the priority of the user equipment 115 only), or by taking into account them (in this case, the resource allocation may be carried out in the same way as for new transmissions (see further phases), with a dedicated and separated Collision List).

Then (block 210), user equipment 115 (comprised in the cell 110) which require resources are listed in the Priority List in an ordered sequence. As already mentioned before, the user equipment 115 of the Priority List are ordered according to priority values PV (quantifying the priority of that user equipment 115 in being served with a corresponding sub-band) calculated by a priority function, which in turn exploit CQI values and long term information relating to the user equipment 115.

The next step provides for checking whether the Collision List is empty or not (block 212).

If the Collision List is not empty, meaning that there are some user equipment 115 within the cell 110 that are not being served with requested sub-bands because of collisions with requests by other user equipment 115 (exit branch N of block 212), the first user equipment 115 listed in the Collision List is selected (block 220). The selected user equipment 115 is removed from both the Collision List and the Priority List, and then the bandwidth is examined to select the best sub-band to be allocated for that selected user equipment 115, i.e., the sub-band corresponding to the best channel quality for that specific user equipment 115.

Then, a check is made to assess whether the selected sub-band has been already assigned to other user equipment 115 or not (block 224).

If the selected sub-band has been already assigned to other user equipment 115 (exit branch Y of block 224), a collision has occurred. In this case, the selected user equipment 115 cannot be served with the selected sub-band, and it is inserted at the bottom of the Collison List (block 226). According to an embodiment of the present invention, the Collision List operates in a First In First Out (FIFO) way, so that user equipment 115 at the bottom of that list will be served later than user equipment 115 at the top of the list.

If instead the selected sub-band has not been already assigned (exit branch N of block 224), the selected sub-band is allocated to the selected user equipment 115, the selected sub-band is flagged as "already assigned", and the selected user equipment 115 is removed from the Collision List (block 228) to be inserted in the Served User List. The user equipment 115 listed in the Served User List is ordered according to their respective priority values PV.

After block 226 or block 228, the scheduling resource algorithm 200, according to an embodiment of the present invention, provides for checking if all the user equipment 115 listed in the Collision List has been subjected to the operations corresponding to blocks 224-228 or not (block 230).

In the negative case (exit branch N of block 230), the scheduling resource algorithm 200 provides for selecting the first user equipment 115 of the Collison List (return to block 220) to carry out the above described operation corresponding to blocks 224-228 on the newly selected user equipment 115.

In the positive case (exit branch Y of block 230) or in case the Collision List has been assessed to be empty (exit branch Y of block 212), the scheduling resource algorithm 200, according to an embodiment of the present invention, provides for serving the remaining user equipment 115 listed in the Priority List.

In greater detail, the first user equipment 115 listed in the Priority List is selected (block 235). The selected user equipment 115 is removed from the Priority List, and then the bandwidth is examined to select the best sub-band to be allocated for that selected user equipment 115.

Then, a check is made to assess whether the selected sub-band has been already assigned to other user equipment 115 or not (block 240).

If the selected sub-band has been already assigned to other user equipment 115 (exit branch Y of block 240), a collision has occurred. In this case, the selected user equipment 115 cannot be served with the selected sub-band, and it is inserted at the bottom of the Collison List (block 244).

If instead the selected sub-band has not been already assigned (exit branch N of block 240), the selected sub-band is allocated to the selected user equipment 115, the selected sub-band is flagged as "already assigned", and the selected user equipment 115 is removed from the Priority List (block 250) to be inserted in the Served User List (according to an order which is based on its priority value PV).

After block 244 or block 250, the scheduling resource algorithm 200 according to an embodiment of the present invention provides for checking if all the user equipment 115 listed in the Priority List have been subjected to the operations corresponding to blocks 235-250 or not (block 260).

In the negative case (exit branch N of block 260), the scheduling resource algorithm 200 provides for selecting the next user equipment 115 of the Priority List (return to block 235) to carry out the above described operation corresponding to blocks 235-250 on the newly selected user equipment 115.

In the positive case (exit branch Y of block 260), the scheduling resource algorithm 200 according to an embodiment of the present invention provides for allocating the remaining resources (if any) to user equipment 115 that has been already served in the previous phases (i.e., the user equipment 115 listed in the Served User List).

For this purpose, a check is made to assess whether there are still available sub-bands to be allocated or not (block 265).

In the positive case (exit branch Y of block 265), the bandwidth is examined to select the best sub-band—among the still available sub-bands—to be allocated to the first user equipment 115 listed in the Served User List (block 270). Then, such selected sub-band is allocated to the first user equipment 115 listed in the Served User List, the selected sub-band is flagged as "already assigned", and the user equipment 115 is moved to the bottom of the Served User List. At this point, the scheduling resource algorithm 200 returns back to block 265 in order to check whether there are still further available sub-bands to be allocated or not.

According to an embodiment of the present invention, the abovementioned phase 270 can be freely carried out for the downlink scheduling, since downlink user equipment 115 can be also served with non-adjacent sub-bands. Conversely, since in uplink user equipment 115 have to be served only with adjacent sub-bands, if the still available sub-bands are not adjacent to the sub-band(s) already allocated to a user equipment 115 in the TTI, in the case of uplink scheduling, phase 270 is skipped.

When all the sub-bands are allocated (exit branch N of block 265), the scheduling resource algorithm 200 according to an embodiment of the present invention provides for carrying out a check on the resources that have been allocated (block 275). of this phase is to avoid wasting resources, since it is possible that some user equipment 115 have been served with a too high amount of resources (for example because the amount of data to be transmitted/received is quite low, or because for QoS policy some users are throughput limited). In this case, the scheduling resource algorithm 200 according to an embodiment of the present invention provides for allocating the resources taken away from such equipment to the next user equipment 115 listed in the Served User List. It has to be appreciated that in this last phase, the content of the Served User List is not changed.

At this point, the phases 208-275 of the scheduling resource algorithm 200 are repeated for the next TTI (returning back to block 208).

The scheduling resource algorithm 200 described above is configured to allocate resources (sub-bands) to user equipment 115 at each TTI or group of TTIs. According to an embodiment of the present invention, the sub-bands which have been allocated at a TTI are actually served to the corresponding user equipment 115 during a following TTI, such as for example during the next TTI (e.g., for the downlink case) or after a higher number of TTIs (e.g., for the uplink case).

Figure 3:
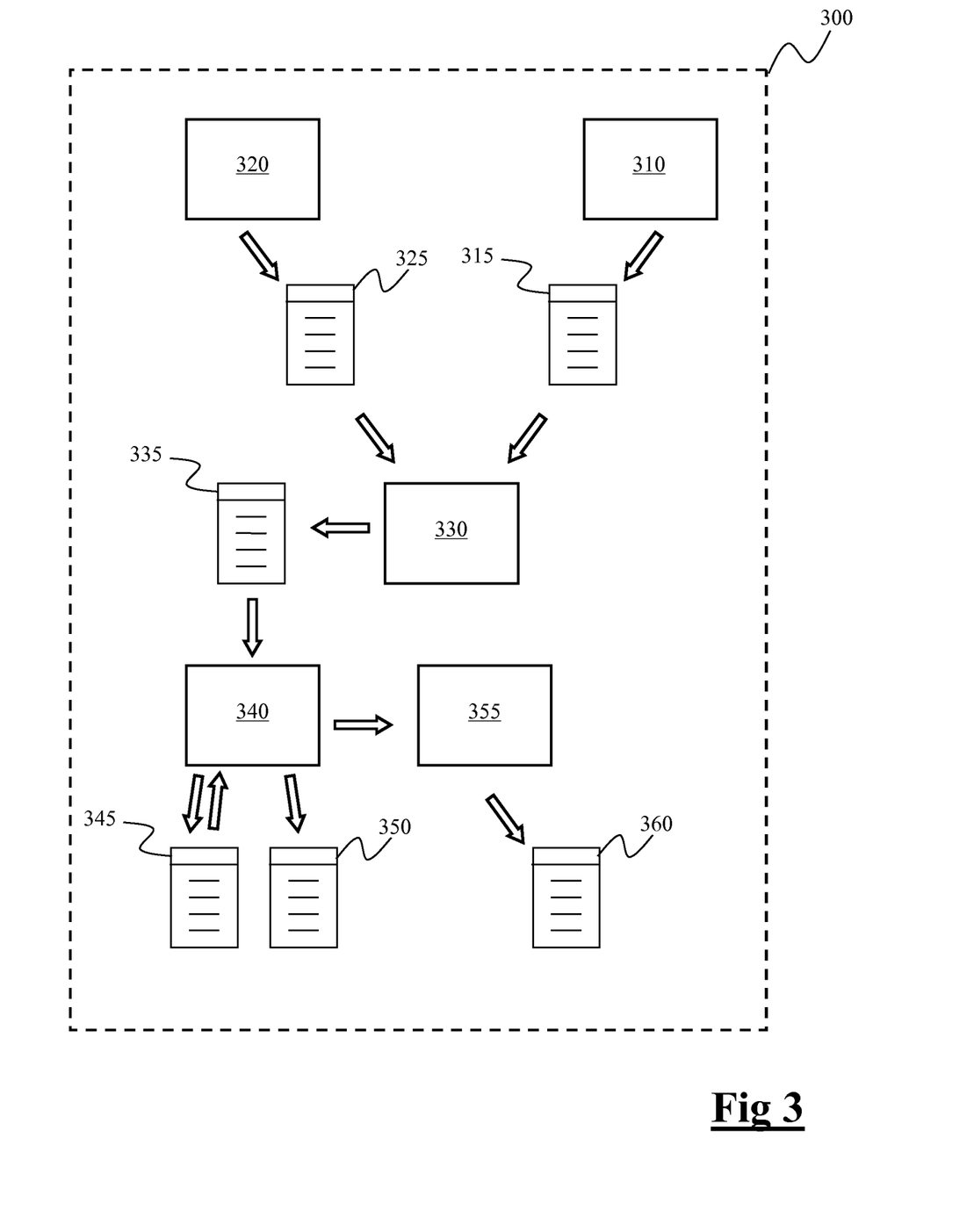
FIG. 3 shows in terms of functional blocks a scheduler configured to implement the scheduling resource algorithm of FIG. 2 according to an embodiment of the present invention.

FIG. 3 schematically shows, in terms of functional blocks, a scheduler 300 configured to implement the scheduling resource algorithm 200 according to an embodiment of the present invention.

The scheduler 300 comprises a channel information collector 310 configured to collect uplink and downlink channel quality indicators (e.g., CQI, BLER, ACK number, throughput) from the user equipment 115 and arranging them into a corresponding User Info List 315.

Moreover, the scheduler 300 comprises a data request collector 320 configured to receive sub-bands requests from the user equipment 115 to generate a User Request List 325 listing the user equipment 115 requiring sub-bands.

The scheduler 300 further comprises a priority calculator 330 configured to generate the Priority List (identified in figure with reference 335) by arranging the user equipment 115 listed in the User Request List 325 in an ordered list by calculating priority values PV based on the channel quality indicators listed in the User Info List 315 as previously described.

The scheduler 300 further comprises a collision handler 340 configured to handle occurrences of collisions caused by different user equipment 115 requiring a same sub-band as previously described. For this purpose, the collision handler 340 is configured to exploit the Priority List 335, as well as to generate and manage the Collision List (identified in figure with reference 345) and the Served User List (identified in figure with reference 350).

The scheduler 300 comprises a resource allocator 355 adapted to generate an Allocation List 360 listing how the sub-bands are assigned to the user equipment 115 (both in uplink and downlink) according to the collision handler 340 operation.

According to an embodiment of the present invention, the scheduler 300 is in the form of, e.g., software and/or firmware, instructions of a computer program adapted to be loaded on and carried out by computers or machines provided with processing capabilities. According to a preferred embodiment of the present invention, the scheduler 300 is adapted to be carried out by processing circuits of the network nodes 105.

Naturally, in order to satisfy local and specific requirements, a person skilled in the art may apply to the solution described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in any other embodiment.

More specifically, the solution according to an embodiment of the invention lends itself to be implemented through an equivalent method (by using similar steps, removing some steps being not essential, or adding further optional steps); moreover, the steps may be performed in different order, concurrently or in an interleaved way (at least partly).

In addition, analogous considerations apply if the cellular network has a different structure or comprises equivalent components, or it has other operating features. In any case, any component thereof may be separated into several elements, or two or more components may be combined into a single element; in addition, each component may be replicated for supporting the execution of the corresponding operations in parallel. It should also be noted that any interaction between different components generally does not need to be continuous (unless otherwise indicated), and it may be both direct and indirect through one or more intermediaries.

Moreover, although explicit reference has been made to a cellular network based on the LTE/LTE-Advanced standard, it should be understood that it is not the intent of the Applicant to be limited to the implementation of any particular wireless communication system architecture or protocol. In this respect, it is also possible to provide that, with suitable simple modifications, the proposed scheduling algorithm may be applied also to other cellular networks, such as the view forthcoming 5G (and beyond) cellular networks.

The invention claimed is:

1. A method for allocating resource blocks on a cellular network, the cellular network comprising a plurality of transceiver stations each configured to provide cell coverage for allowing user equipment within a cell to exchange data flows via an uplink or downlink, the method comprising, at a cell, executing a sequence of operations, at each transmission time interval or a group of transmission time intervals, the operations comprising:
   a) listing user equipment requiring resource blocks in a corresponding priority list according to a first ordered sequence, the first ordered sequence being based on a priority of the user equipment in being served; and
   b) following the first ordered sequence, for the user equipment listed in the priority list, executing operations b1) and b2), or b1) and b3):
      b1) selecting a corresponding first set of resource blocks comprising at least one resource block;
      b2) if the selected first set of resource blocks has not been already assigned to other user equipment, assigning to the user equipment the selected first set of resource blocks for serving the user equipment; and b3) if the selected first set of resource blocks has been already assigned to other user equipment, removing the user equipment from the priority list and inserting the user equipment in a collision list, wherein the sequence of operations further comprises:
if the collision list is not empty, before carrying out a second execution of operation b), assigning second sets of resource blocks to user equipment listed in the collision list, for serving the user equipment listed in the collision list, wherein the assigning the second sets of resource blocks to the user equipment listed in the collision list comprises:
selecting the user equipment at a top of the collision list;
removing the user equipment from the collision list;
selecting a corresponding second set of resource blocks comprising at least one resource block;
if the selected second set of resource blocks has not been already assigned to other user equipment, assigning to the user equipment the selected second set of resource blocks for serving the user equipment; and
if the selected second set of resource blocks has been already assigned to other user equipment, inserting the user equipment at a bottom of the collision list.

2. The method of claim 1, wherein the removing the user equipment from the priority list and inserting the user equipment in a collision list further comprises inserting the user equipment at a bottom of the collision list.

3. The method of claim 1, wherein the selecting the corresponding first set of resource blocks comprising the at least one resource block for the user equipment comprises selecting, based on channel conditions, an optimal set of resource blocks for serving the user equipment.

4. The method of claim 1, wherein the selecting the corresponding second set of resource blocks comprising the at least one resource block for the user equipment comprises selecting, based on channel conditions, an optimal set of resource blocks for serving the user equipment.

5. The method of claim 4, wherein the selecting the corresponding second set of resource blocks comprising the at least one resource block for the user equipment comprises selecting the optimal set of resource blocks based on one or more of:
channel quality indicator,
block error rate,
ACK number, and
throughput.

6. The method of claim 1, further comprising, before carrying out operation a):
assigning sets of resource blocks to user equipment which require retransmitting packets of data that in a previous transmission time interval or in a previous group of transmission time intervals have not been correctly received.

7. The method of claim 1, wherein the listing user equipment requiring resource blocks in the corresponding priority list according to the first ordered sequence based on the priority of the user equipment in being served comprises:
for the user equipment requiring resource blocks, calculating a corresponding priority value through a priority function based on at least one among:
channel quality indicator;
block error rate;
ACK number; and
throughput; and
ordering the user equipment in the priority list based on the priority values calculated for the user equipment.

8. The method of claim 7, wherein the user equipment having a set of resource blocks assigned thereto is inserted in a served list, the user equipment being listed in the served list according to a second ordered sequence based on the priority values calculated for the user equipment.

9. The method of claim 8 further comprising, after having executed operation b):
checking whether there are still available resource blocks to be assigned; and
if there are still available resource blocks, assigning the still available resource blocks to the user equipment listed in the served list following the second ordered sequence.

10. The method of claim 1, wherein each set of resource blocks comprises a single resource block or a group of adjacent resource blocks.

11. The method of claim 1, wherein the listing user equipment requiring resource blocks in the corresponding priority list according to the first ordered sequence based on the priority of the user equipment in being served comprises:
for the user equipment requiring resource blocks, calculating a corresponding priority value through a priority function based on:
channel quality indicator;
throughput; and
one or more of: a block error rate or an ACK number; and
ordering the user equipment in the priority list based on the priority values calculated for the user equipment.

12. A transceiver station of a cellular network configured to provide cell coverage for allowing user equipment within a cell to exchange data flows in uplink or downlink, the transceiver station comprising a scheduler for allocating resource blocks to the user equipment, the scheduler comprising:
a priority calculator configured to list user equipment requiring resource blocks in a corresponding priority list according to a first ordered sequence, the first ordered sequence being based on a priority of the user equipment in being served; and
a collision handler configured to execute operations comprising:
a) following the first ordered sequence, for the user equipment listed in the priority list, executing operations a1) and a2) or a1) and a3):
a1) selecting a corresponding first set of resource blocks comprising at least one resource block;
a2) if the selected first set of resource blocks has not been already assigned to other user equipment, assigning to the user equipment the selected first set of resource blocks for serving the user equipment; and
a3) if the selected first set of resource blocks has been already assigned to other user equipment, removing the user equipment from the priority list and inserting the user equipment in a collision list, wherein if the collision list is not empty, before carrying out a second execution of operation a), the collision handler is further configured to assign second sets of resource blocks to user equipment listed in the collision list, for serving the user equipment listed in the collision list wherein the assigning the second sets of resource blocks to the user equipment listed in the collision list comprises:
selecting the user equipment at a top of the collision list;
removing the user equipment from the collision list;
selecting a corresponding second set of resource blocks comprising at least one resource block;
if the selected second set of resource blocks has not been already assigned to other user equipment, assigning to the user equipment the selected second set of resource blocks for serving the user equipment; and
if the selected second set of resource blocks has been already assigned to other user equipment, inserting the user equipment at a bottom of the collision list.

13. The transceiver station of claim 12, wherein the collision handler is further configured to remove the user equipment from the priority list and insert the user equipment in a collision list by inserting the user equipment at a bottom of the collision list.

14. The transceiver station of claim 12, wherein the collision handler is configured to select a corresponding first set of resource blocks comprising at least one resource block for user equipment by selecting, based on channel conditions, an optimal set of resource blocks for serving the user equipment.

15. The transceiver station of claim 12, wherein the collision handler is configured to select a corresponding second set of resource blocks comprising at least one resource block for user equipment by selecting, based on channel conditions, an optimal set of resource blocks for serving the user equipment.

* * * * *